Oct. 17, 1972 NORIO TSUBOUCHI ET AL 3,699,045

PIEZOELECTRIC CERAMIC-MATERIAL

Filed Dec. 22, 1967 8 Sheets-Sheet 1

INVENTORS
NORIO TSUBOUCHI
MASAO TAKAHASHI
TOMEJI OHNO
TSUNEO AKASHI

BY Hopgood & Calimafde
ATTORNEYS

Oct. 17, 1972 NORIO TSUBOUCHI ET AL 3,699,045

PIEZOELECTRIC CERAMIC-MATERIAL

Filed Dec. 22, 1967 8 Sheets-Sheet 2

INVENTORS
NORIO TSUBOUCHI
MASAO TAKAHASHI
TOMEJI OHNO
TSUNEO AKASHI

BY Hopgood & Calimafde
ATTORNEYS

INVENTORS
NORIO TSUBOUCHI
MASAO TAKAHASHI
TOMEJI OHNO
TSUNEO AKASHI
BY
Hopgood & Calimafde
ATTORNEYS INVENTORS
NORIO TSUBOUCHI
MASAO TAKAHASHI
TOMEJI OHNO
TSUNEO AKASHI
BY Hopgood & Calimafde
ATTORNEYS Oct. 17, 1972 NORIO TSUBOUCHI ET AL 3,699,045

PIEZOELECTRIC CERAMIC-MATERIAL

Filed Dec. 22, 1967 8 Sheets-Sheet 5

INVENTORS
NORIO TSUBOUCHI
MASAO TAKAHASHI
TOMEJI OHNO
TSUNEO AKASHI

BY Hopgood & Calimafde
ATTORNEYS

INVENTORS
NORIO TSUBOUCHI
MASAO TAKAHASHI
TOMEJI OHNO
TSUNEO AKASHI
BY Hopgood & Calimafde
ATTORNEYS

PIEZOELECTRIC CERAMIC-MATERIAL

Filed Dec. 22, 1967 8 Sheets-Sheet 7

INVENTORS
NORIO TSUBOUCHI
MASAO TAKAHASHI
TOMEJI OHNO
TSUNEO AKASHI
BY Hopgood & Calimafde
ATTORNEYS INVENTORS
NORIO TSUBOUCHI
MASAO TAKAHASHI
TOMEJI OHNO
TSUNEO AKASHI
BY Hopgood & Calimafde
ATTORNEYS 3,699,045

PIEZOELECTRIC CERAMIC-MATERIAL

Norio Tsubouchi, Masao Takahashi, Tomeji Ohno, and Tsuneo Akashi, Tokyo-to, Japan, assignors to Nippon Electric Company, Limited, Tokyo-to, Japan Filed Dec. 22, 1967, Ser. No. 692,739
Claims priority, application Japan, Dec. 29, 1966, 42/971, 42/972, 42/974, 42/21,108, 42/25,273, 42/25,274, 42/49,623, 42/56,175
Int. Cl. C04b *35/46, 35/48*
U.S. Cl. 252—62.9 5 Claims

ABSTRACT OF THE DISCLOSURE

A piezoelectric ceramic material is provided consisting essentially of a solid solution of the three components $Pb(Mn_{1/3}Z_{2/3})O_3$, $PbTiO_3$ and $PbZrO_3$, wherein Z represents one element selected from the group consisting of Nb, Ta, Sb and Bi.

Figure 1:
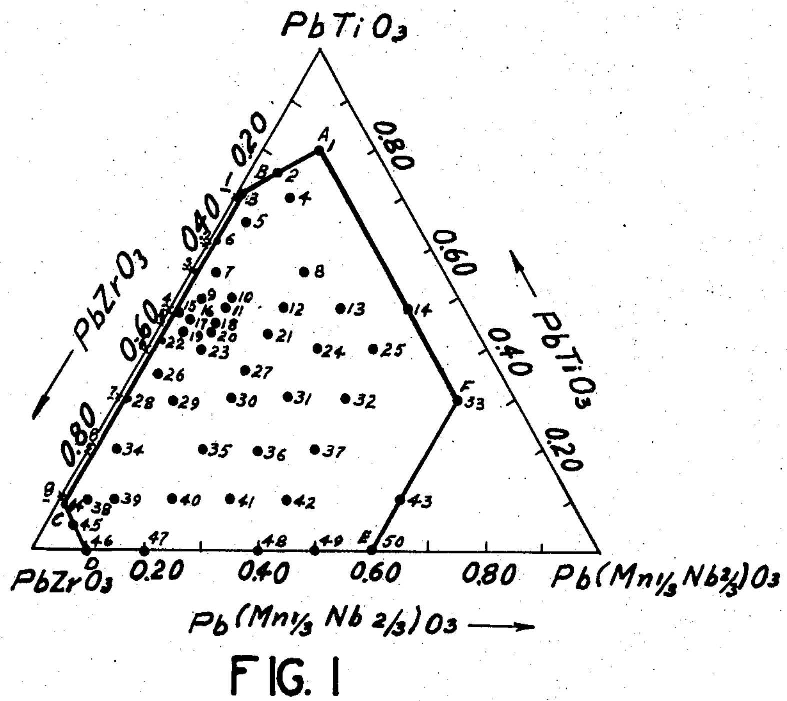

This invention relates to piezoelectric materials and more particularly to novel piezoelectric ceramics having excellent piezoelectric properties.

Fundamental measures for evaluating in practice the piezoelectric properties of a piezoelectric material are the electromechanical coupling factor and the mechanical quality factor. The former is a representative of the efficiency of transforming the electric oscillation into mechanical vibration and of conversely transforming the mechanical vibration into electrical oscillation. Greater electromechanical coupling factor stands for better efficiency of interconversion. The latter shows the reciprocal proportion of the energy consumed by the material during the energy conversion, larger mechanical quality factor accounting for smaller energy consumption.

One of the typical fields of application of piezoelectric materials is manufacture of the elements of ceramic filters. In this case, it is necessary to furnish the electromechanical coupling factor with an optimum value selected from a wide range between an extremely great value and a very small value and it is desirable for the mechanical quality factor to assume as large a value as possible. This fact is fully described in, for example, R. C. V. Macaria, "Design Data for Band-Pass Ladder Filter Employing Ceramic Resonators" which appears in Electronic Engineering, vol. 33, No. 3 (1961), pp. 171–177.

The transducer elements of mechanical filters provide another important field of application of piezoelectric ceramics. In this case, both the electromechanical coupling factor and the mechanical quality factor should be as large as possible.

It has been often true, however, that conventional piezoelectric ceramics, for example, barium titanate ($BaTiO_3$) and lead titanate zirconate $[Pb(Ti \cdot Zr)O_3]$ have the electromechanical coupling factor and the mechanical quality factor one or both of which is of extremely small value and hence they are unfit for the practical use. In particular, the mechanical quality factor has often been so small as to make the practical use of the ceramics impossible. Attempts have been made to improve these factors by incorporating various additional constitutents into the ceremics such as lead titanate zirconate ceramics but in most cases have resulted in improvement of only one of electromechanical coupling factor and mechanical quality factor. Thus, these two factors have not remarkably improved simultaneously.

The object of this invention is to provide a novel piezoelectric ceramic material having large values of both the electromechanical coupling factor and mechanical quality factor.

The other object of this invention is to provide a novel piezoelectric ceramic material suited for use in various fields such as manufacture of the elements of ceramic filters and the transducer elements of mechanical filters.

This invention is based on the new discovery that the ceramic compositions consisting essentially of a solid solution of $Pb(Mn_{1/3}Z_{2/3})O_3$-$PbTiO_3$-$PbZrO_3$ ternary system, where Z represents one element selected from Nb, Ta, Sb, and Bi, show the excellent piezoelectric properties and hence have the practical utility.

The above ceramic compositions contain lead (Pb) as a divalent metallic element and also titanium (Ti) and zirconium (Zr) as tetravalent metallic elements. Moreover, the element manganese (Mn) and one element selected from niobium (Nb), tantalum (Ta), antimony (Sb), and bismuth (Bi) are contained in such a proportion that they may be, as a whole, substantially equivalent to a tetravalent metallic element.

In case that niobium (Nb) is selected for Z and that the ceramic material of the $$Pb(Mn_{1/3}Nb_{2/3})O_3\text{-}PbTiO_3\text{-}PbZrO_3$$

ternary systems is represented by the compositional formula $$[Pb(Mn_{1/3}Nb_{2/3})O_3]_x[PbTiO_3]_y[PbZrO_3]_z$$

where $x$, $y$ and $z$ represent a set of mol ratios of the components and $x+y+z=1.00$, it has been found that the compositions should be restricted, in view of their effective properties, within the range determined by the following combination of the sets of mol ratios $x$, $y$ and $z$:

| x | y | z |
|---|---|---|
| 0.10 | 0.80 | 0.10 |
| 0.01 | 0.71 | 0.28 |
| 0.01 | 0.09 | 0.90 |
| 0.10 | 0.00 | 0.90 |
| 0.60 | 0.00 | 0.40 |
| 0.60 | 0.30 | 0.10 |

Also, when tantalum (Ta) is selected for Z, the effective range of the ceramic compositions given by the formula $$[Pb(Mm_{1/3}Ta_{2/3}O_3]_x[PbTiO_3]_y[PbZrO_3]_z$$

where $x+y+z=1.00$, should be within the range defined by the following combination of the sets of mol ratios $x$, $y$, and $z$:

| x | y | z |
|---|---|---|
| 0.01 | 0.55 | 0.44 |
| 0.01 | 0.09 | 0.90 |
| 0.05 | 0.05 | 0.90 |
| 0.20 | 0.05 | 0.75 |
| 0.50 | 0.23 | 0.27 |
| 0.30 | 0.50 | 0.20 |
| 0.10 | 0.70 | 0.20 |
| 0.05 | 0.70 | 0.25 |
| 0.02 | 0.68 | 0.30 |

Where antimony (Sb) is selected for Z, the effective range of the ceramic compositions given by the formula $$[Pb(Mn_{1/3}Sb_{2/3})O_3]_x[PbTiO_3]_y[PbZrO_3]_z$$

where $x+y+z=1.00$, is decided by the following combination of the sets of mol ratios $x$, $y$ and $z$:

| x | y | z |
|---|---|---|
| 0.10 | 0.80 | 0.10 |
| 0.01 | 0.71 | 0.28 |
| 0.01 | 0.09 | 0.90 |
| 0.05 | 0.05 | 0.90 |
| 0.30 | 0.05 | 0.65 |
| 0.30 | 0.50 | 0.20 |
| 0.20 | 0.70 | 0.10 |

Moreover, where bismuth (Bi) is selected for Z, the effective range of the ceramic compositions represented by the formula $$[Pb(Mm_{1/3}Bi_{2/3})O_3]_x[PbTiO_3]_y[PbZrO_3]_z$$

where $x+y+z=1.00$, is decided by the following combination of the sets of mol ratios $x$, $y$ and $z$:

| x | y | z |
|---|---|---|
| 0.01 | 0.60 | 0.39 |
| 0.01 | 0.09 | 0.90 |
| 0.05 | 0.05 | 0.90 |
| 0.20 | 0.20 | 0.60 |
| 0.20 | 0.43 | 0.37 |
| 0.10 | 0.60 | 0.30 |

Among the conventional piezoelectric ceramics, known is a ceramic solid solution of the $$Pb(Mg_{1/3}Nb_{2/3})O_3\text{-}PbTiO_3\text{-}PbZrO_3$$

ternary system, which is disclosed in the U.S. Pat. 3,268,-453 granted Aug. 23, 1966, to H. Ouchi et al. This conventional ceramic material, however, does not improve by itself the piezoelectric properties of the previous $PbTiO_3$-$PbZrO_3$ ceramics, and an excellent piezoelectric ceramic material is obtained only by adding thereto at least one of oxides of manganese, cobalt, nickel, iron and chromium as additional constituents up to 3 weight percent. In contrast, the ceramic material of $$Pb(Mn_{1/3}Z_{2/3})O_3\text{-}PbTiO_3\text{-}PbZrO_3$$

ternary system of this invention, where Z represents Nb, Ta, Sb or Bi, remarkably improves the piezoelectric properties by itself (i.e. without any additional constituent). This difference in improvement of piezoelectric properties between the conventional compositions and the novel compositions of this invention is, it is believed, due to the fact that the conventional compositions use in the basic composition magnesium (Mg), an element belonging to the Group II–A in the periodic table, in conjunction with a Group V–B element niobium (Nb), while in the compositions of this invention a Group VII–B element manganese (Mn) is used in conjunction with a Group V–B or V–A element niobium (Nb), tantalum Ta), antimony (Sb), or bismuth (Bi).

Excellent piezoelectric properties of the ceramic compositions of this invention will be apparent from the following more particular description of preferred examples of this invention, as illustrated in the accompanying drawings.

Figure 3:
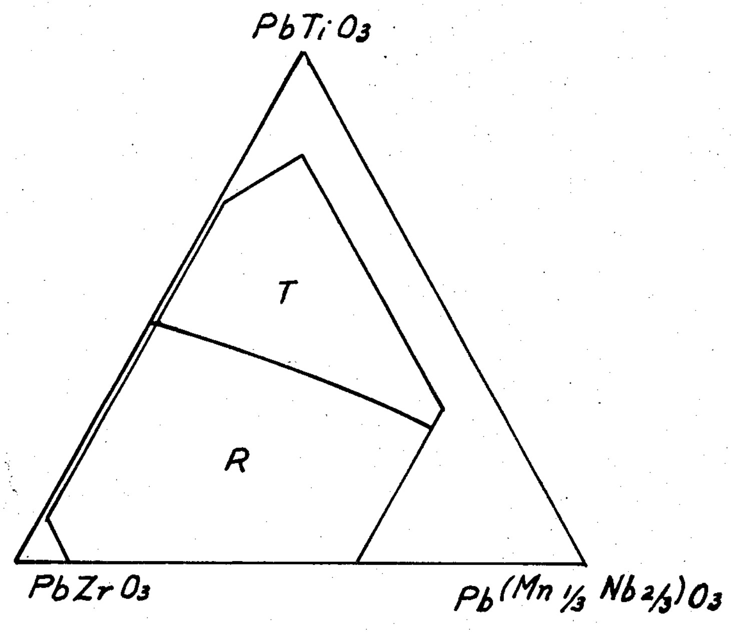
Figure 2A:
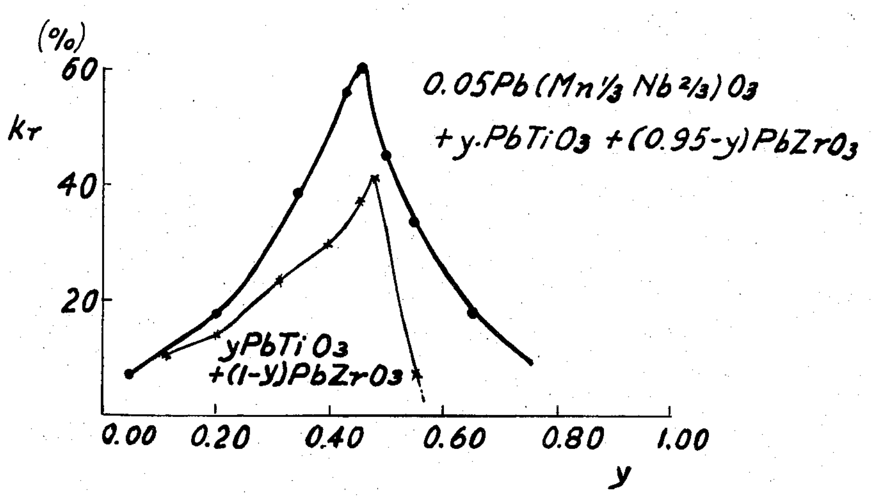
Figure 2B:
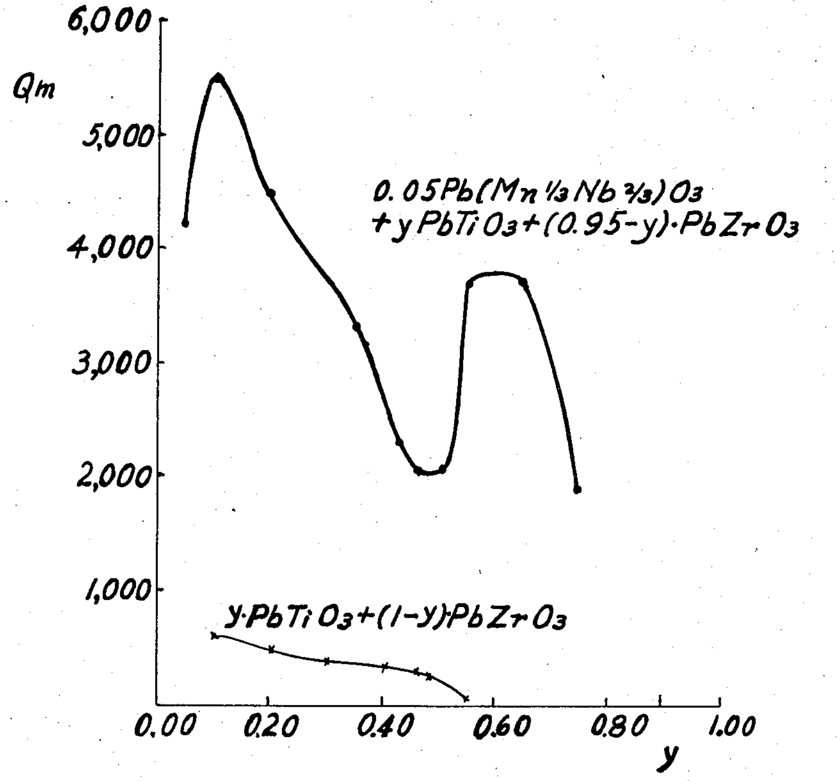
Figure 4:
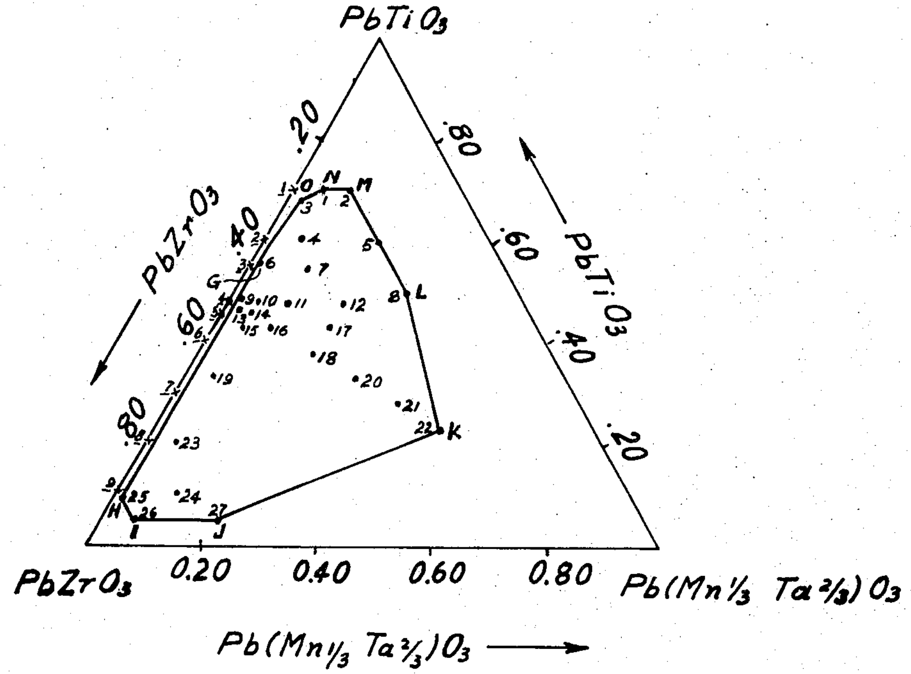
Figure 6:
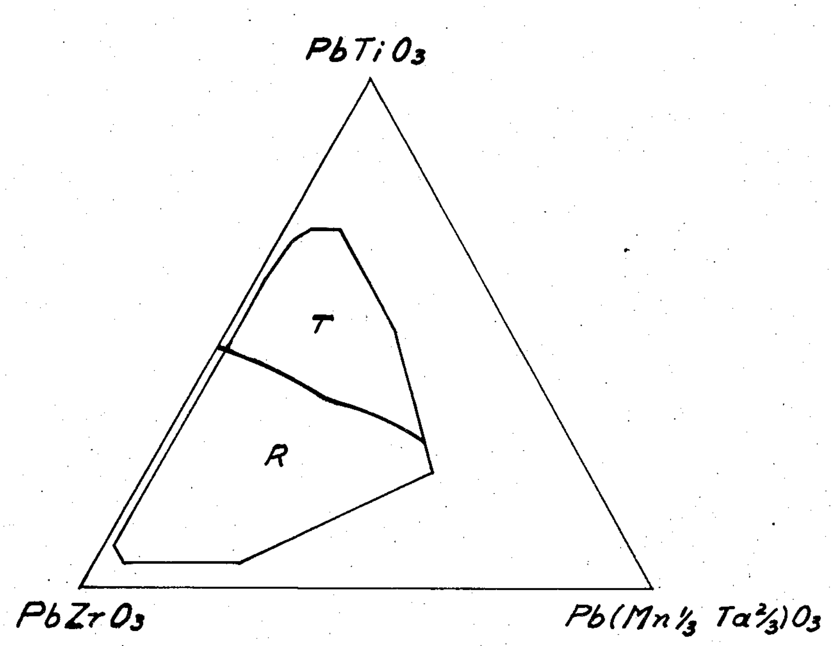
Figure 5A:
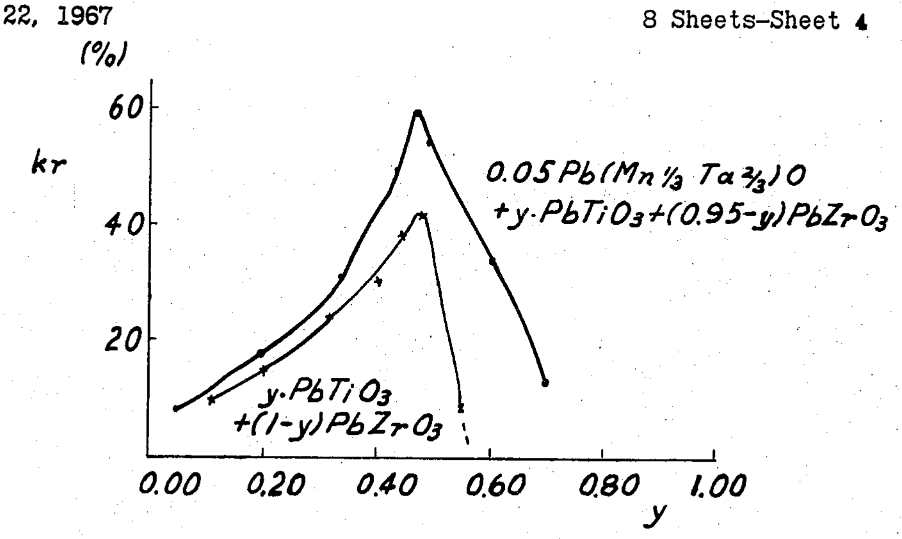
Figure 5B:
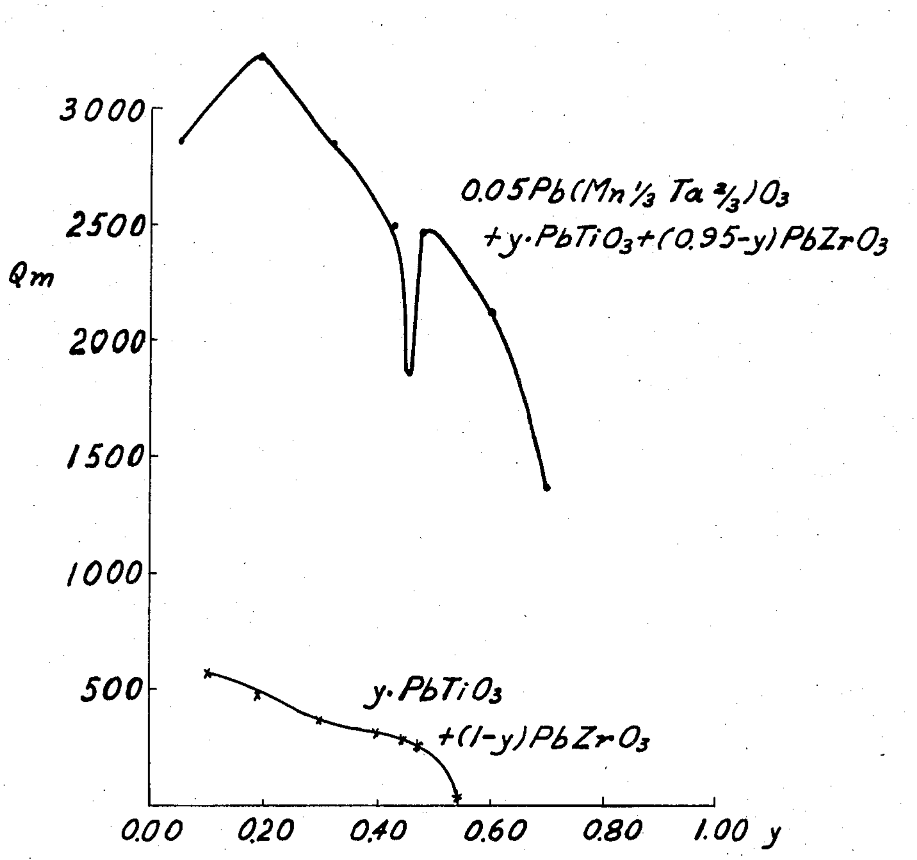
Figure 7:
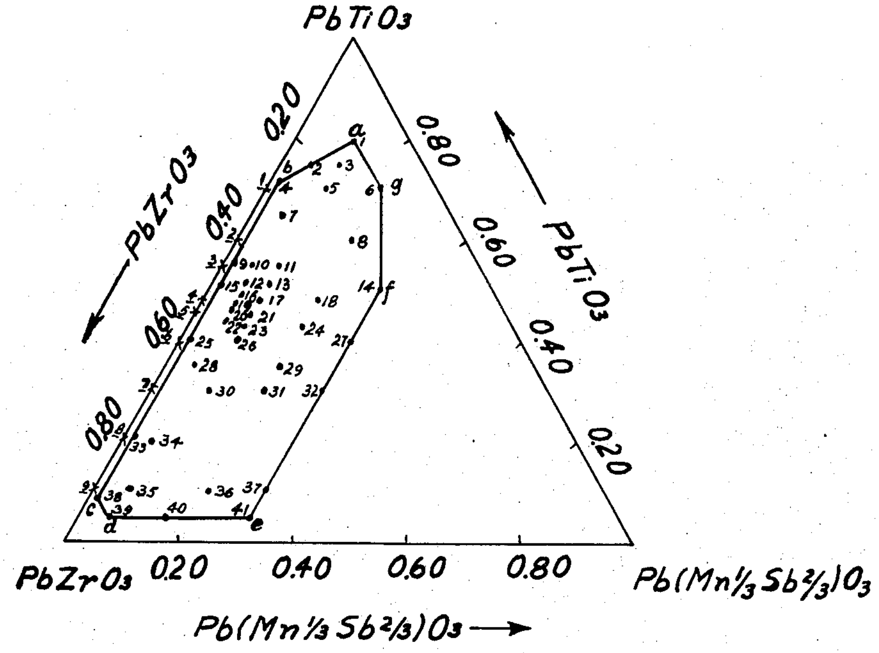
Figure 9:
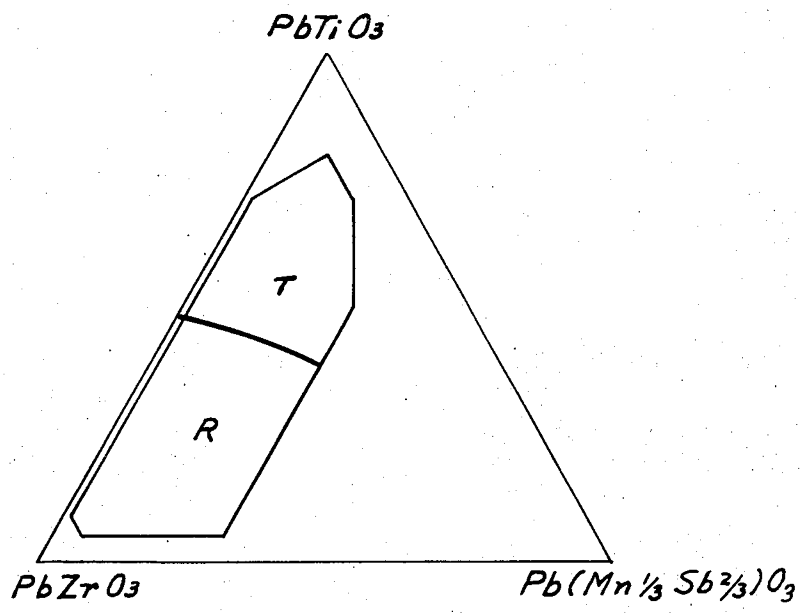
Figure 8A:
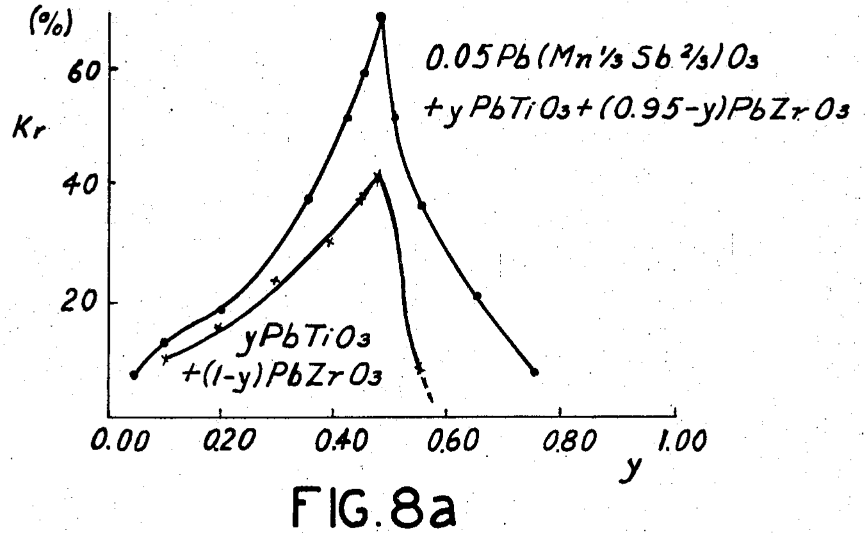
Figure 8B:
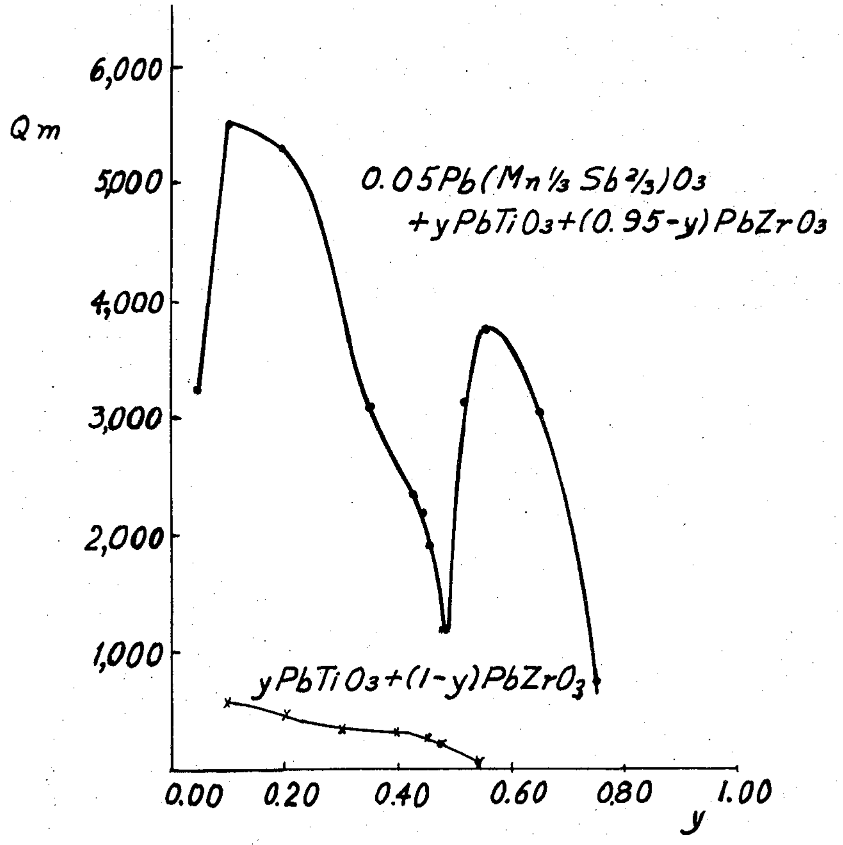
Figure 10:
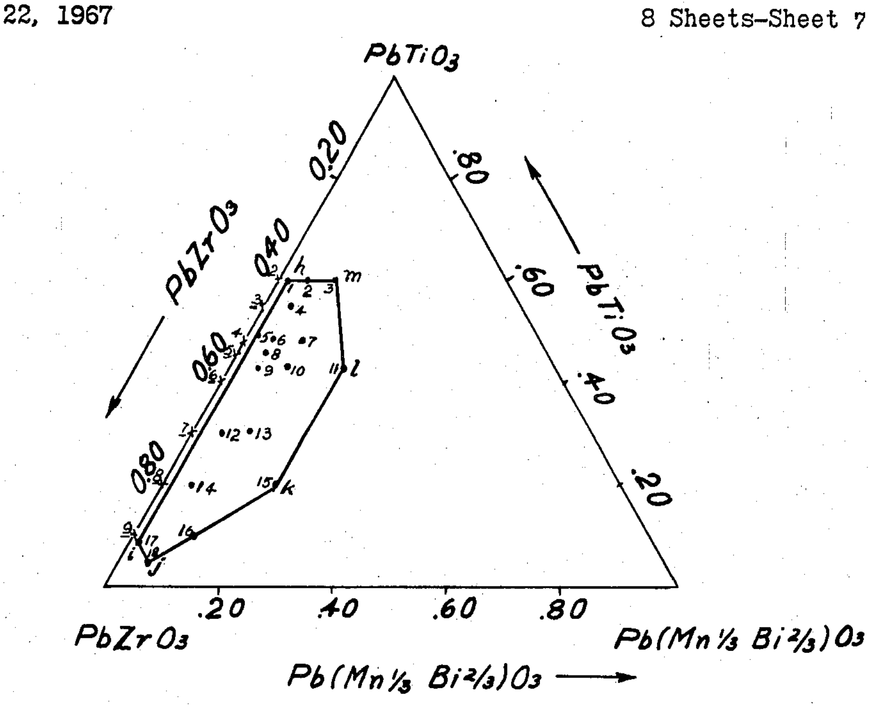
Figure 12:
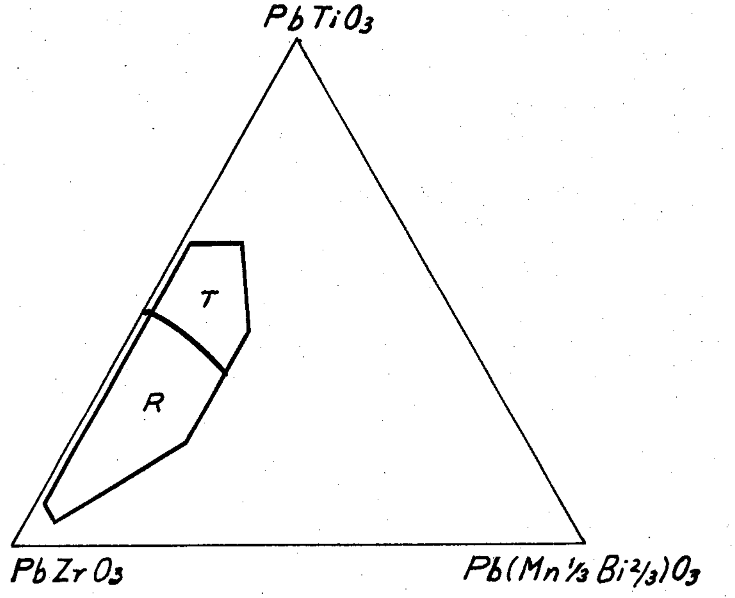
Figure 11A:
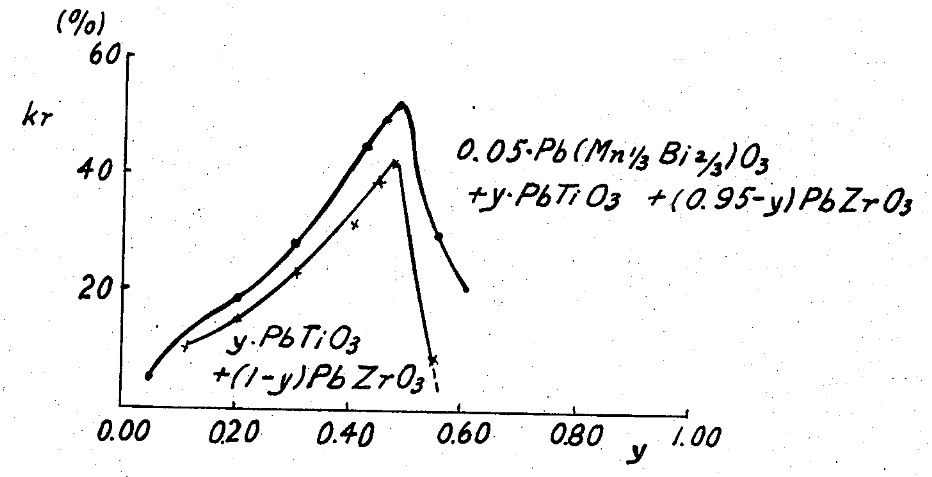
Figure 11B:
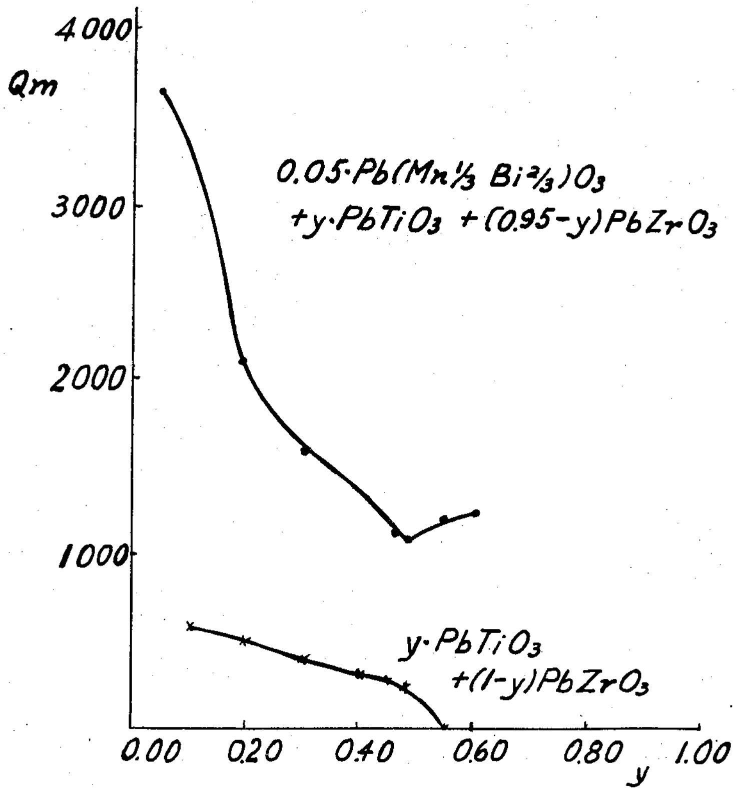

In the drawings:

FIGS. 1, 4, 7, and 10 are the triangular compositional diagrams of the ternary system showing both the effective ranges of the compositions of this invention and the specific compositions of the examples;

FIGS. 2(*a*)(*b*), 5(*a*)(*b*), 8(*a*)(*b*), and 11(*a*)(*b*) are graphs showing the electromechanical coupling factors [(*a*)] and the mechanical quality factors [(*b*)] of both the conventional lead titanate zirconate ceramics and the ceramics of this invention, as a function of compositional change of lead titanate and lead zirconate in both the ceramics; and FIGS. 3, 6, 9, and 12 are the phase diagrams of the ternary system of this invention; while FIGS. 1, 2 and 3 are for the novel ternary system $$Pb(Mn_{1/3}Nb_{2/3})O_3\text{-}PbTiO_3\text{-}PbZrO_3$$

among the ceramic compositions of this invention;

FIGS. 4, 5 and 6 are for the novel ternary system $$(Pb(Mn_{1/3}Ta_{2/3})O_3\text{-}PbTiO_3\text{-}PbZrO_3$$

among the ceramic compositions of this invention;

FIGS. 7, 8 and 9 are for the novel ceramic material of $Pb(Mn_{1/3}Sb_{2/3})O_3$-$PbTiO_3$-$PbZrO_3$ ternary system of this invention; and FIGS. 10, 11 and 12 are for the novel ceramic material of $Pb(Mn_{1/3}Bi_{2/3})O_3$-$PbTiO_3$-$PbZrO_3$ ternary system of this invention.

EXAMPLES

Powdered materials of lead monoxide (PbO), manganese carbonate ($MnCO_3$), niobium pentoxide ($Nb_2O_5$), titanium dioxide ($TiO_2$) and zirconium dioxide ($ZrO_2$) were used as starting materials to obtain the $$Pb(Mn_{1/3}Nb_{2/3})O_3\text{-}PbTiO_3\text{-}PbZrO_3$$

ceramics of this invention, unless otherwise remarked. These powdered materials were so weighed that the final specimens may have the compositional proportions shown in Table 1. Also, powdered materials of lead monoxide (PbO), manganese carbonate ($MnCO_3$), titanium dioxide ($TiO_2$), and zirconium dioxide ($ZrO_2$), and in addition, one tantalum pentoxide ($Ta_2O_5$), antimony sesquioxide ($Sb_2O_3$) and bismuth sesquioxide ($Bi_2O_3$) were used as starting materials to obtain the $$Pb(Mn_{1/3}Ta_{2/3})O_3\text{-}PbTiO_3\text{-}PbZrO_3$$

ceramics, the $Pb(Mn_{1/3}Sb_{2/3})O_3$-$PbTiO_3$-$PbZrO_3$ ceramics or the $Pb(Mn_{1/3}Bi_{2/3})O_3$-$PbTiO_3$-$PbZrO_3$ ceramics of this invention, unless otherwise remarked. These powders were also weighed in such a manner that the final specimens may have the compositional proportions shown in Table 2, 3 or 4. Here, manganese carbonate ($MnCO_3$), antimony sesquioxide ($Sb_2O_3$) and bismuth sesquioxide ($Bi_2O_3$) were weighed as calculated on the basis of manganese monoxide (MnO), antimony pentoxide ($Sb_2O_5$) and bismuth pentoxide ($Bi_2O_5$), respectively. In addition the powder of lead monoxide, titanium dioxide and zirconium dioxide were weighed to obtain the conventional lead titanate zirconate ceramics having the compositional proportions shown in Table 5.

The respective powder were mixed in a ball mill with distilled water. The mixed powder were subjected to filtration, dried, crushed, then presintered at 900° C. for one hour, and again crushed. Thereafter, the mixtures, with a small amount of distilled water being added thereto, were press molded into discs of 20 mm. is diameter at a pressure of 700 kg./cm.$^2$ and sintered in an atmosphere of lead monoxide (PbO) for one hour at a temperature specified in tables. Incidentally, the specimens of $Pb(Mn_{1/3}Bi_{2/3})O_3$-$PbTiO_3$-$PbZrO_3$ system were sintered in an atmosphere of lead monoxide (PbO) and bismuth sesquioxide ($Bi_2O_3$). The resulting ceramic discs were polished on both surfaces to the thickness of one millimeter, provided with silver electrodes on both surfaces, and thereafter piezoelectrically activated through the polarization treatment at 100° C. or at room temperature for one hour under an applied D.C. electric field of 20 to 50 kv./cm. Both the polarizing temperature and electric field actually used are shown in the tables.

After the ceramic discs had been allowed to stand for 24 hours, the electromechanical coupling factor for the radial mode vibration ($k_r$) and the mechanical quality factor ($Q_m$) were measured to evaluate the piezoelectric activities. The measurement of these piezoelectric properties was made according to the IRE standard circuit. The value of $k_r$ was calculated by the resonant to anti-resonant frequency method. The dielectric constant ($\epsilon$) and the dielectric loss (tan $\delta$) were also measured at a frequency of 1 kHz. and at a room temperature.

Tables 1 through 5 show typical results obtained. In the tables, the specimens are arranged according to the $PbTiO_3$ content thereof and there are also listed several values of Curie temperature which was determined through measurement of temperature variation in the dielectric constant ($\epsilon$). The novel compositions of the specimens of Tables 1, 2, 3, and 4 are shown with black points in FIGS. 1, 4, 7, and 10, respectively, while the conventional compositions of the specimens of Table 5 are indicated by crosses in the same figures.

The results for the specimens Nos. 17 and 18 of Table 1, Nos. 10 and 14 of Table 2, Nos. 16, 19 and 20 of Table 3, and Nos. 6 and 8 of Table 4 representatively show that the ceramics of this invention have extremely large values of both $k_r$ and $Q_m$. In the specimens Nos. 7, 29 and 39 of Table 1, No. 24 of Table 2, Nos. 10, 30 and 35 of Table 3, and No. 18 of Table 4, increase in the $Q_m$ value is particularly remarked. Comparison of these results with those for the specimens Nos. 4 and 9 of Table 5 will reveal that the greatest $k_r$ and $Q_m$ values of the novel ceramics of this invention are far superior to the maximum $k_r$ and $Q_m$ values of the conventional lead titanate zirconate ceramics which have been known as the most excellent piezoelectric ceramic material. Moreover, comparison of the results in Table 1, 2, 3, or 4 with those in Table 5, particularly between the novel and conventional ceramics in which the ratios of the $PbTiO_3$ content and the $PbZrO_3$ content are similar to each other, will also indicate that both $k_r$ and $Q_m$ are remarkably improved in the ceramics of this invention. This latter fact will be more clearly understood from FIG. 2 (a) (b), FIG. 5 (a) (b), FIG. 8 (a) (b), or FIG. 11 (a) (b), wherein the curves of a thick line represent the $k_r$ values [(*a*)] and the $Q_m$ values [(*b*)] of a novel ceramic material containing 5 mol percent of $Pb(Mn_{1/3}Nb_{2/3})O_3$ [FIG. 2], $Pb(Mn_{1/3}Ta_{2/3})O_3$ [FIG. 5], $Pb(Mn_{1/3}Sb_{2/3})O_3$ [FIG. 8], or $$Pb(Mn_{1/3}Bi_{2/3})O_3$$

[FIG. 11], the varying amount $v$ of $PbTiO_3$ and the remaining amount of $PbZrO_3$, while the curves of a fine line show the $k_r$ values [(*a*)] and the $Q_m$ values [(*b*)] of a conventional lead titanate zirconate ceramic material with the varying amount $v$ of $PbTiO_3$.

As is seen from the above, this invention provides the excellent, useful piezoelectric ceramics having the quite large values of both $k_r$ and $Q_m$.

In the novel ceramics of $Pb(Mn_{1/3}Z_{2/3})O_3$-$PbTiO_3$-$PbZrO_3$ ternary system (Z is Nb, Ta, Sb, or Bi) of this invention, the superior piezoelectric properties as mentioned above are available only when the compositions represented by the formula $$[Pb(Mn_{1/3}Z_{2/3})O_3]_x[PbTiO]_y[PbZrO]_z$$

where $x$, $y$ and $z$ represent a set of mol ratios and $x+y+x=1.00$ and where Z represents one element selected from Nb, Ta, Sb, and Bi falls within the area A-B-C-D-E-F of FIG. 1 of the drawing in case Nb is seleceted for Z, within the area G-H-I-J-K-L-M-N-O of FIG. 4 of the drawing in case Ta is selected for Z, within the area *a-b-c-d-e-f-g* of FIG. 7 of the drawing in case Sb is selected for Z, and within the area *h-i-j-k-l-m* of FIG. 10 of the drawing in case Bi is selected for Z. The sets of mol ratios of the vertices of each area are as follows:

| | *x* | *y* | *z* |
|---|---|---|---|
| A | 0.10 | 0.80 | 0.10 |
| B | 0.01 | 0.71 | 0.28 |
| C | 0.01 | 0.09 | 0.90 |
| D | 0.10 | 0.00 | 0.90 |
| E | 0.60 | 0.00 | 0.40 |
| F | 0.60 | 0.30 | 0.10 |
| G | 0.01 | 0.55 | 0.44 |
| H | 0.01 | 0.09 | 0.90 |
| I | 0.05 | 0.05 | 0.90 |
| J | 0.20 | 0.05 | 0.75 |
| K | 0.50 | 0.23 | 0.27 |
| L | 0.30 | 0.50 | 0.20 |
| M | 0.10 | 0.70 | 0.20 |
| N | 0.50 | 0.70 | 0.25 |
| O | 0.02 | 0.68 | 0.30 |
| *a* | 0.10 | 0.82 | 0.10 |
| *b* | 0.01 | 0.71 | 0.28 |
| *c* | 0.01 | 0.09 | 0.90 |
| *d* | 0.05 | 0.05 | 0.90 |
| *e* | 0.30 | 0.05 | 0.65 |
| *f* | 0.30 | 0.50 | 0.20 |
| *g* | 0.20 | 0.70 | 0.10 |
| *h* | 0.01 | 0.60 | 0.39 |
| *i* | 0.01 | 0.09 | 0.90 |
| *j* | 0.05 | 0.05 | 0.90 |
| *k* | 0.20 | 0.20 | 0.60 |
| *l* | 0.20 | 0.43 | 0.37 |
| *m* | 0.10 | 0.60 | 0.30 |

In case the $Pb(Mn_{1/3}Z_{2/3})O_3$ content (Z represents Nb, Ta, Sb, or Bi) of the ternary system ceramic material is less than that falling within the above-mentioned area, it becomes impossible to complete the sintering in manufacture of the ceramics and besides the piezoelectric properties of the ceramics obtained are inferior to or nearly equal to those of the conventional lead titanate zirconate ceramics or otherwise, even if improved, insufficient for practical use. If the $Pb(Mn_{1/3}Z_{2/3})O_3$ content (Z is Nb, Ta, Sb, or Bi) is more than that falling within the above-mentioned area, accomplishment of the sintering is very difficult and the ceramics obtained have not practicable piezoelectric properties. Where the $PbTiO_3$ content is outside the above-mentioned area, the piezoelectric properties of the ceramics so deteriorate as to make the practical use impossible. Finally, in case the $PbZrO_3$ content is less than the effective content falling within the above-mentioned area, it follows that completion of the sintering becomes difficult, that the polarization treatment is not perfectly carried out and that a useful piezoelectric ceramic material is not obtainable. While, the $PbZrO_3$ content more than the effective content results an unuseful piezoelectric ceramic material having markedly inferior piezoelectric properties.

In view of the above, it is determined that the ceramics of this invention, if required to apply to a practical use, should have the compositions falling within any of the areas specified above. The ceramics of the effective compositions show excellent piezoelectric properties and have a high Curie temperature, as shown in Tables 1 through 4, so that the piezoelectric activities may not be lost up to elevated temperature.

The ternary system of $Pb(Mn_{1/3}Z_{2/3})O_3$ (Z represents Nb, Ta, Sb, or Bi), $PbTiO_3$, and $PbZrO_3$ of this invention exists in a solid solution in greater parts of compositions and such a solid solution has a perovskite-type crystalline structure. FIGS. 3, 6, 9, and 12 show the crystalline phases of the ceramic compositions falling within the areas A-B-C-D-E-F of FIG. 1, G-H-I-J-K-L-M-N-O of FIG. 4, *a-b-c-d-e-f-g* of FIG. 7, and *h-i-j-k-l-m* of FIG. 10, respectively, as determined at room temperature by the powder method of X-ray analysis. These compositions have a perovskite-type crystalline structure and belong to either the tetragonal phase (indicated by "T" in the figures) or the rhombohedral phase (indicated by "R"). The morphotropic phase boundary is shown with a thick line in each figure. In general, $k_r$ is extremely great for the compositions in the vicinity of this phase boundary, while $Q_m$ is extremely large for the compositions remote from this phase boundary.

It will be apparent that the starting materials to be used in manufacture of the ceramics of this invention are not limited to those used in the above examples. In detail, those oxides which are easily decomposed at elevated temperature to form the required compositions may be used instead of any starting material of the above examples, as exemplified by $Pb_3O_4$ for PbO and by $MnO_2$ for $MnCO_3$ in the examples. Also, those salts such as oxalates or carbonates may be used instead of the oxides used in the examples, which are easily decomposed into the respective oxides at elevated temperature. Otherwise, hydroxides of the same character as above, such as $Nb(OH)_5$, may be used instead of the oxides such as $Nb_2O_5$. Moreover, an excellent piezoelectric ceramic material having similar properties to the above examples is still also obtainable by separately preparing the powdered material of each $Pb(Mn_{1/3}Z_{2/3})O_3$ (Z is Nb, Ta, Sb, or Bi), $PbTiO_3$ and $PbZrO_3$ in advance and by using them as starting materials to be mixed subsequently.

It is usual that niobium pentoxide ($Nb_2O_5$), tantalum pentoxide ($Ta_2O_5$) and zirconium dioxide ($ZrO_2$) which are available in the market contain, respectively, several percent of tantalum pentoxide ($Ta_2O_5$), niobium pentoxide ($Nb_2O_5$) and hafnium dioxide ($HfO_2$). Accordingly, the ceramic compositions of this invention are allowed to contain small amounts of such oxides or elements as existing in the materials available in the market. Moreover, it is presumable that addition of a small amount of some additional constituent to the ceramic compositions of this invention may further improve the piezoelectric properties, from the similar fact recognized in the conventional lead titanate zirconate ceramics. It will be understood from the foregoing that the ceramic compositions of this invention may include appropriate additives.

While there have been described what at present are believed to be the preferred examples of this invention, it will be obvious that various modifications can be made therein without departing from the scope of this invention and that this invention covers all the ceramic compositions as specified in the appended claims.

TABLE 1

| No. | Mol ratio of composition: $Pb(Mn_{1/3}Nb_{2/3})O_3$, $x$ | $PbTiO_3$, $y$ | $PbZrO_3$, $z$ | Sintering temp. (° C.) | Polarizing: Temp. (° C.) | Polarizing: Electric field (kv./cm.) | $k_r$ (percent) | $Q_m$ | $\epsilon$ | Tan $\delta$ (percent) | Curie temp. (° C.) |
|---|---|---|---|---|---|---|---|---|---|---|---|
| 1 | 0.10 | 0.80 | 0.10 | 1,300 | 100 | 50 | 6 | 910 | 210 | 2.3 | ---------- |
| 2 | 0.05 | 0.75 | 0.20 | 1,300 | 100 | 50 | 10 | 1,870 | 200 | 1.6 | ---------- |
| 3 | 0.01 | 0.71 | 0.28 | 1,300 | 100 | 50 | 4 | 300 | 190 | 1.6 | ---------- |
| 4 | 0.10 | 0.70 | 0.20 | 1,300 | 100 | 50 | 11 | 1,300 | 250 | 1.8 | ---------- |
| 5 | 0.05 | 0.65 | 0.30 | 1,300 | 100 | 50 | 18 | 3,700 | 290 | 1.1 | ---------- |
| 6 | 0.01 | 0.60 | 0.39 | 1,300 | 100 | 50 | 8 | 210 | 270 | 1.8 | ---------- |
| 7 | 0.05 | 0.55 | 0.40 | 1,300 | 100 | 50 | 33 | 3,700 | 520 | 1.0 | ---------- |
| 8 | 0.20 | 0.55 | 0.25 | 1,300 | 100 | 30 | 28 | 1,800 | 570 | 2.4 | ---------- |
| 9* | 0.05 | 0.50 | 0.45 | 1,300 | 100 | 50 | 46 | 2,010 | 680 | 1.0 | ---------- |
| 10 | 0.10 | 0.50 | 0.40 | 1,300 | 100 | 50 | 44 | 2,600 | 820 | 1.4 | ---------- |
| 11 | 0.10 | 0.48 | 0.42 | 1,300 | 100 | 50 | 47 | 2,360 | 890 | 1.2 | ---------- |
| 12 | 0.20 | 0.48 | 0.32 | 1,300 | 100 | 30 | 35 | 2,000 | 810 | 2.3 | ---------- |
| 13 | 0.30 | 0.48 | 0.22 | 1,300 | r.t. | 40 | 26 | 1,140 | 640 | 4.5 | ---------- |
| 14 | 0.42 | 0.48 | 0.10 | 1,270 | r.t. | 30 | 8 | 340 | 630 | 7.5 | ---------- |
| 15 | 0.01 | 0.47 | 0.52 | 1,300 | 100 | 50 | 40 | 180 | 970 | 2.0 | ---------- |
| 16 | 0.02 | 0.47 | 0.51 | 1,300 | 100 | 50 | 49 | 770 | 1,180 | 1.1 | 350 |
| 17 | 0.05 | 0.46 | 0.49 | 1,300 | 100 | 50 | 61 | 2,030 | 630 | 1.1 | ---------- |
| 18** | 0.10 | 0.45 | 0.45 | 1,300 | 100 | 50 | 59 | 1,900 | 1,000 | 1.2 | ---------- |
| 19 | 0.05 | 0.43 | 0.52 | 1,300 | 100 | 50 | 57 | 2,270 | 350 | 1.1 | ---------- |
| 20 | 0.10 | 0.43 | 0.47 | 1,300 | 100 | 50 | 51 | 2,340 | 470 | 1.2 | ---------- |
| 21 | 0.20 | 0.43 | 0.37 | 1,300 | 100 | 30 | 52 | 1,000 | 1,050 | 3.5 | 280 |
| 22 | 0.01 | 0.40 | 0.59 | 1,300 | 100 | 50 | 31 | 230 | 460 | 3.5 | ---------- |
| 23 | 0.10 | 0.40 | 0.50 | 1,300 | 100 | 50 | 46 | 3,400 | 370 | 1.2 | ---------- |
| 24 | 0.30 | 0.40 | 0.30 | 1,300 | r.t. | 40 | 44 | 630 | 1,050 | 4.1 | 260 |
| 25 | 0.40 | 0.40 | 0.20 | 1,270 | r.t. | 40 | 32 | 400 | 1,080 | 8.2 | 215 |
| 26 | 0.05 | 0.35 | 0.60 | 1,300 | 100 | 50 | 39 | 3,300 | 280 | 1.0 | ---------- |
| 27 | 0.20 | 0.35 | 0.45 | 1,300 | 100 | 30 | 42 | 2,400 | 450 | 2.0 | ---------- |
| 28 | 0.01 | 0.30 | 0.69 | 1,300 | 100 | 50 | 20 | 250 | 370 | 3.3 | ---------- |
| 29 | 0.10 | 0.30 | 0.60 | 1,300 | 100 | 50 | 33 | 5,000 | 300 | 1.2 | ---------- |
| 30* | 0.20 | 0.30 | 0.50 | 1,300 | 100 | 30 | 37 | 3,400 | 380 | 1.8 | ---------- |
| 31 | 0.30 | 0.30 | 0.40 | 1,300 | r.t. | 40 | 33 | 2,000 | 470 | 3.3 | ---------- |
| 32 | 0.40 | 0.30 | 0.30 | 1,270 | r.t. | 40 | 27 | 880 | 620 | 5.8 | ---------- |
| 33 | 0.60 | 0.30 | 0.10 | 1,270 | r.t. | 20 | 5 | 250 | 980 | 11.2 | 190 |
| 34 | 0.05 | 0.26 | 0.75 | 1,300 | 100 | 50 | 17 | 4,470 | 200 | 1.1 | ---------- |
| 35 | 0.20 | 0.20 | 0.60 | 1,300 | 100 | 30 | 24 | 4,800 | 340 | 1.6 | ---------- |
| 36 | 0.30 | 0.20 | 0.50 | 1,300 | r.t. | 40 | 23 | 2,700 | 420 | 2.7 | ---------- |
| 37 | 0.40 | 0.20 | 0.40 | 1,270 | r.t. | 40 | 23 | 1,500 | 500 | 4.6 | ---------- |
| 38** | 0.05 | 0.10 | 0.85 | 1,300 | 100 | 50 | 10 | 5,500 | 180 | 1.1 | ---------- |
| 39 | 0.10 | 0.10 | 0.80 | 1,300 | 100 | 50 | 11 | 6,300 | 220 | 1.2 | ---------- |
| 40 | 0.20 | 0.10 | 0.70 | 1,300 | 100 | 30 | 15 | 4,100 | 390 | 1.5 | ---------- |
| 41 | 0.30 | 0.10 | 0.60 | 1,300 | r.t. | 40 | 10 | 2,800 | 550 | 2.7 | ---------- |
| 42 | 0.40 | 0.10 | 0.50 | 1,270 | r.t. | 40 | 14 | 1,000 | 460 | 4.1 | ---------- |
| 43 | 0.60 | 0.10 | 0.30 | 1,270 | r.t. | 20 | 10 | 750 | 990 | 12.3 | ---------- |
| 44 | 0.01 | 0.09 | 0.90 | 1,300 | 100 | 50 | 6 | 480 | 320 | 2.4 | ---------- |
| 45 | 0.05 | 0.05 | 0.90 | 1,300 | 100 | 50 | 7 | 4,200 | 170 | 1.6 | ---------- |
| 46 | 0.10 | 0.00 | 0.90 | 1,300 | 100 | 50 | 4 | 400 | 250 | 1.1 | ---------- |
| 47 | 0.20 | 0.00 | 0.80 | 1,300 | 100 | 30 | 6 | 1,800 | 700 | 2.0 | ---------- |
| 48 | 0.40 | 0.00 | 0.60 | 1,270 | r.t. | 40 | 8 | 620 | 680 | 4.6 | ---------- |
| 49 | 0.50 | 0.00 | 0.50 | 1,270 | r.t. | 30 | 7 | 560 | 970 | 7.5 | ---------- |
| 50 | 0.60 | 0.00 | 0.40 | 1,270 | r.t. | 20 | 4 | 420 | 1,030 | 9.6 | ---------- |

NOTE.—See footnotes at end of Table 4.

TABLE 2

| No. | Mol ratio of composition: $Pb(Mn_{1/3}Ta_{2/3})O_3$, $x$ | $PbTiO_3$, $y$ | $PbZrO_3$, $z$ | Sintering temp. (° C.) | Polarizing: Temp. (° C.) | Polarizing: Electric field (kv./cm.) | $k_r$ (percent) | $Q_m$ | $\epsilon$ | Tan $\delta$ (percent) | Curie temp. (° C.) |
|---|---|---|---|---|---|---|---|---|---|---|---|
| 1 | 0.05 | 0.70 | 0.25 | b | 100 | 40 | 13 | 1,380 | 240 | 1.4 | ---------- |
| 2 | 0.10 | 0.70 | 0.20 | b | 100 | 40 | 16 | 1,560 | 300 | 1.6 | ---------- |
| 3 | 0.02 | 0.68 | 0.30 | b | 100 | 40 | 4 | 1,740 | 240 | 1.2 | ---------- |
| 4 | 0.05 | 0.60 | 0.35 | b | 100 | 40 | 34 | 2,120 | 620 | 1.3 | ---------- |
| 5** | 0.20 | 0.60 | 0.20 | b | r.t. | 40 | 10 | 1,280 | 370 | 3.6 | ---------- |
| 6 | 0.01 | 0.55 | 0.44 | b | 100 | 40 | 18 | 560 | 460 | 2.0 | ---------- |
| 7 | 0.10 | 0.55 | 0.35 | b | 100 | 40 | 16 | 1,230 | 530 | 1.8 | ---------- |
| 8 | 0.30 | 0.50 | 0.20 | a | r.t. | 30 | 12 | 680 | 570 | 6.2 | ---------- |
| 9 | 0.01 | 0.48 | 0.51 | b | 100 | 40 | 52 | 190 | 940 | 2.3 | ---------- |
| 10* | 0.05 | 0.48 | 0.47 | b | 100 | 40 | 54 | 2,470 | 1,070 | 1.1 | ---------- |
| 11 | 0.10 | 0.48 | 0.42 | b | 100 | 40 | 34 | 1,380 | 640 | 1.6 | ---------- |
| 12 | 0.20 | 0.48 | 0.32 | b | r.t. | 40 | 25 | 1,010 | 600 | 3.6 | ---------- |
| 13 | 0.02 | 0.47 | 0.51 | b | 100 | 40 | 47 | 570 | 1,000 | 1.5 | ---------- |
| 14 | 0.05 | 0.46 | 0.49 | b | 100 | 40 | 59 | 1,840 | 560 | 1.1 | 355 |
| 15 | 0.05 | 0.43 | 0.52 | b | 100 | 40 | 50 | 2,500 | 380 | 1.1 | ---------- |
| 16 | 0.10 | 0.43 | 0.47 | b | 100 | 40 | 33 | 860 | 540 | 1.5 | 325 |
| 17* | 0.20 | 0.43 | 0.37 | b | r.t. | 40 | 29 | 760 | 660 | 3.6 | ---------- |
| 18** | 0.20 | 0.38 | 0.42 | b | r.t. | 40 | 27 | 1,300 | 530 | 3.3 | 270 |
| 19 | 0.05 | 0.33 | 0.62 | b | 100 | 40 | 31 | 2,850 | 340 | 1.4 | ---------- |
| 20* | 0.30 | 0.33 | 0.37 | a | r.t. | 30 | 19 | 810 | 660 | 5.0 | 215 |
| 21 | 0.40 | 0.28 | 0.32 | a | r.t. | 30 | 14 | 610 | 740 | 5.3 | 170 |
| 22 | 0.50 | 0.23 | 0.27 | a | r.t. | 30 | 7 | 150 | 940 | 12.3 | 145 |
| 23 | 0.05 | 0.20 | 0.75 | b | 100 | 40 | 18 | 3,230 | 240 | 1.5 | ---------- |
| 24 | 0.10 | 0.10 | 0.80 | b | 100 | 40 | 10 | 4,340 | 225 | 1.0 | ---------- |
| 25 | 0.01 | 0.09 | 0.90 | b | 100 | 40 | 10 | 820 | 320 | 3.4 | ---------- |
| 26 | 0.05 | 0.05 | 0.90 | b | 100 | 40 | 8 | 2,870 | 210 | 1.6 | ---------- |
| 27 | 0.20 | 0.05 | 0.75 | b | r.t. | 40 | 4 | 550 | 850 | 3.1 | ---------- |

NOTE.—See footnotes at end of Table 4.

TABLE 3

| No. | Mol ratio of composition Pb(Mn1/3Sb2/3)O3, x | PbTiO3, y | PbZrO3, z | Sintering temp. (° C.) | Polarizing Temp. (° C.) | Polarizing Electric field (kv./cm.) | $k_r$ (percent) | $Q_m$ | ε | Tan δ (percent) | Curie temp. (° C.) |
|---|---|---|---|---|---|---|---|---|---|---|---|
| 1 | 0.10 | 0.80 | 0.10 | 1,280 | 100 | 50 | 5 | 1,200 | 160 | 2.2 | |
| 2 | 0.05 | 0.75 | 0.20 | 1,300 | 100 | 50 | 8 | 750 | 180 | 1.0 | |
| 3 | 0.10 | 0.75 | 0.15 | 1,280 | 100 | 50 | 9 | 2,220 | 210 | 1.9 | |
| 4 | 0.01 | 0.71 | 0.28 | 1,300 | 100 | 50 | 9 | 280 | 270 | 2.3 | |
| 5 | 0.10 | 0.70 | 0.20 | 1,280 | 100 | 50 | 8 | 2,270 | 250 | 1.6 | |
| 6 | 0.20 | 0.70 | 0.10 | 1,260 | r.t. | 40 | 7 | 370 | 280 | 1.5 | |
| 7** | 0.05 | 0.65 | 0.30 | 1,300 | 100 | 50 | 21 | 3,090 | 330 | 1.1 | |
| 8 | 0.20 | 0.60 | 0.20 | 1,260 | r.t. | 40 | 7 | 650 | 410 | 1.1 | |
| 9 | 0.01 | 0.55 | 0.44 | 1,300 | 100 | 50 | 10 | 250 | 620 | 1.6 | |
| 10 | 0.05 | 0.55 | 0.40 | 1,300 | 100 | 50 | 37 | 3,800 | 640 | 1.2 | |
| 11* | 0.10 | 0.55 | 0.35 | 1,280 | 100 | 50 | 31 | 3,170 | 650 | 1.4 | |
| 12 | 0.05 | 0.51 | 0.44 | 1,300 | 100 | 50 | 51 | 3,140 | 960 | 1.1 | |
| 13 | 0.10 | 0.51 | 0.39 | 1,280 | 100 | 50 | 47 | 2,040 | 1,080 | 1.6 | |
| 14 | 0.30 | 0.50 | 0.20 | 1,260 | r.t. | 30 | 5 | 200 | 2,800 | 8.4 | |
| 15 | 0.01 | 0.49 | 0.50 | 1,300 | 100 | 50 | 35 | 120 | 990 | 1.7 | |
| 16 | 0.05 | 0.48 | 0.47 | 1,300 | 100 | 50 | 69 | 1,225 | 1,350 | 1.1 | |
| 17 | 0.10 | 0.48 | 0.42 | 1,280 | 100 | 50 | 53 | 1,800 | 1,120 | 1.5 | |
| 18 | 0.20 | 0.48 | 0.32 | 1,260 | r.t. | 40 | 31 | 860 | 910 | 3.1 | |
| 19 | 0.05 | 0.46 | 0.49 | 1,300 | 100 | 50 | 59 | 1,930 | 490 | 1.0 | |
| 20* | 0.05 | 0.455 | 0.495 | 1,300 | 100 | 50 | 59 | 2,240 | 480 | 1.0 | 300 |
| 21 | 0.10 | 0.45 | 0.45 | 1,280 | 100 | 50 | 53 | 1,800 | 670 | 1.6 | 255 |
| 22 | 0.05 | 0.43 | 0.52 | 1,300 | 100 | 50 | 51 | 2,360 | 400 | 1.1 | |
| 23 | 0.10 | 0.43 | 0.47 | 1,280 | 100 | 50 | 49 | 2,550 | 600 | 1.5 | |
| 24 | 0.20 | 0.43 | 0.37 | 1,260 | r.t. | 40 | 44 | 750 | 790 | 2.8 | 220 |
| 25 | 0.01 | 0.40 | 0.59 | 1,300 | 100 | 50 | 32 | 230 | 470 | 2.9 | |
| 26 | 0.10 | 0.40 | 0.50 | 1,280 | 100 | 50 | 41 | 3,290 | 540 | 1.5 | |
| 27 | 0.30 | 0.40 | 0.30 | 1,260 | r.t. | 30 | 14 | 150 | 1,900 | 7.8 | 180 |
| 28 | 0.05 | 0.35 | 0.60 | 1,300 | 100 | 50 | 38 | 3,100 | 310 | 1.1 | |
| 29 | 0.20 | 0.35 | 0.45 | 1,260 | r.t. | 40 | 36 | 1,600 | 600 | 2.5 | |
| 30 | 0.10 | 0.30 | 0.60 | 1,280 | 100 | 50 | 33 | 4,270 | 400 | 1.5 | |
| 31 | 0.20 | 0.30 | 0.50 | 1,260 | r.t. | 40 | 31 | 2,140 | 560 | 2.7 | |
| 32 | 0.30 | 0.30 | 0.40 | 1,260 | r.t. | 30 | 7 | 1,250 | 720 | 7.4 | |
| 33 | 0.01 | 0.20 | 0.79 | 1,300 | 100 | 50 | 17 | 560 | 320 | 2.7 | |
| 34* | 0.05 | 0.20 | 0.75 | 1,300 | 100 | 50 | 18 | 5,300 | 220 | 1.1 | |
| 35 | 0.05 | 0.10 | 0.85 | 1,300 | 100 | 50 | 13 | 5,500 | 190 | 1.1 | |
| 36** | 0.20 | 0.10 | 0.70 | 1,260 | r.t. | 40 | 10 | 3,620 | 380 | 2.3 | |
| 37 | 0.30 | 0.10 | 0.60 | 1,260 | r.t. | 30 | 7 | 850 | 960 | 9.2 | |
| 38 | 0.01 | 0.09 | 0.90 | 1,300 | 100 | 50 | 11 | 750 | 310 | 2.8 | |
| 39 | 0.05 | 0.05 | 0.90 | 1,300 | 100 | 50 | 7 | 3,220 | 240 | 1.1 | |
| 40 | 0.15 | 0.05 | 0.80 | 1,280 | r.t. | 40 | 8 | 4,500 | 300 | 1.6 | |
| 41 | 0.30 | 0.05 | 0.65 | 1,260 | r.t. | 30 | 5 | 720 | 870 | 9.6 | |

NOTE.—See footnotes at end of Table 4.

TABLE 4

| No. | Mol ratio of composition Pb(Mn1/3Bi2/3)O3, x | PbTiO3, y | PbZrO3, z | Sintering temp. (° C.) | Polarizing Temp. (° C.) | Polarizing Electric field (kv./cm.) | $k_r$ (percent) | $Q_m$ | ε | Tan δ (percent) | Curie temp. (° C.) |
|---|---|---|---|---|---|---|---|---|---|---|---|
| 1 | 0.01 | 0.60 | 0.39 | a | 100 | 40 | 8 | 140 | 360 | 1.5 | |
| 2 | 0.05 | 0.60 | 0.35 | 1,200 | 100 | 40 | 21 | 1,240 | 320 | 3.4 | |
| 3 | 0.10 | 0.60 | 0.30 | 1,150 | 100 | 30 | 10 | 420 | 280 | 6.9 | |
| 4 | 0.05 | 0.55 | 0.40 | 1,200 | 100 | 40 | 29 | 1,210 | 440 | 2.6 | |
| 5 | 0.01 | 0.48 | 0.51 | a | 100 | 40 | 44 | 330 | 1,030 | 2.3 | |
| 6 | 0.05 | 0.48 | 0.47 | 1,200 | 100 | 40 | 52 | 1,110 | 840 | 2.4 | |
| 7* | 0.10 | 0.48 | 0.42 | 1,150 | 100 | 30 | 29 | 380 | 1,058 | 5.7 | |
| 8 | 0.05 | 0.46 | 0.49 | 1,200 | 100 | 40 | 49 | 1,150 | 760 | 2.3 | 365 |
| 9* | 0.05 | 0.43 | 0.52 | 1,200 | 100 | 40 | 45 | 1,550 | 560 | 2.1 | |
| 10 | 0.10 | 0.43 | 0.47 | 1,150 | 100 | 30 | 31 | 390 | 430 | 3.1 | 350 |
| 11 | 0.20 | 0.43 | 0.37 | 1,050 | r.t. | 40 | 12 | 150 | 570 | 7.4 | |
| 12 | 0.05 | 0.30 | 0.65 | 1,200 | 100 | 40 | 28 | 1,570 | 340 | 1.8 | |
| 13 | 0.10 | 0.30 | 0.60 | 1,150 | 100 | 30 | 22 | 460 | 310 | 2.8 | |
| 14 | 0.05 | 0.20 | 0.75 | 1,200 | 100 | 40 | 18 | 2,110 | 230 | 1.1 | |
| 15 | 0.20 | 0.20 | 0.60 | 1,050 | r.t. | 40 | 7 | 280 | 310 | 7.1 | |
| 16 | 0.10 | 0.10 | 0.80 | 1,150 | 100 | 30 | 15 | 350 | 210 | 6.7 | |
| 17 | 0.01 | 0.09 | 0.90 | a | 100 | 40 | 11 | 640 | 300 | 5.2 | |
| 18 | 0.05 | 0.05 | 0.90 | 1,200 | 100 | 40 | 5 | 3,660 | 200 | 1.1 | |

Notes to tables 1 through 4.—(1) In the column of "sintering temp.," "a" represents 1,260–1,300° C. and "b" stands for 1,300–1,340° C.; (2) in the column of "polarizing temp.," "r.t." means room temperature; (3) in manufacture of the specimens with a sole asterisk in their numbers, triplumbic tetroxide ($Pb_3O_4$) was used instead of lead monoxide (PbO) as one of the starting materials; also, for the specimens with double asterisks, manganese dioxide ($MnO_2$) was used instead of manganese carbonate ($MnCO_3$).

TABLE 5

| No. | Mol ratio of composition PbTiO3 | PbZrO3 | Sintering temp. (° C.) | Polarizing Temp. (° C.) | Polarizing Electric field (kv./cm.) | $k_r$ (Percent) | $Q_m$ | ε | Tan δ (percent) |
|---|---|---|---|---|---|---|---|---|---|
| 1 | 0.70 | 0.30 | 1,300 | 100 | 50 | | | 340 | 5.7 |
| 2 | 0.60 | 0.40 | 1,300 | 100 | 50 | | | 300 | 2.4 |
| 3 | 0.55 | 0.45 | 1,300 | 100 | 50 | 8 | 30 | 350 | 1.3 |
| 4 | 0.48 | 0.52 | 1,300 | 100 | 50 | 42 | 250 | 1,060 | 1.6 |
| 5 | 0.45 | 0.55 | 1,300 | 100 | 50 | 38 | 290 | 640 | 3.0 |
| 6 | 0.40 | 0.60 | 1,300 | 100 | 50 | 30 | 320 | 460 | 3.1 |
| 7 | 0.30 | 0.70 | 1,300 | 100 | 50 | 24 | 380 | 380 | 3.3 |
| 8 | 0.20 | 0.80 | 1,300 | 100 | 50 | 15 | 470 | 350 | 3.3 |
| 9 | 0.10 | 0.90 | 1,300 | 100 | 50 | 10 | 580 | 280 | 3.4 |

NOTE.—For the specimens Nos. 1 and 2, the evaluation of piezoelectric activity was impossible.

What is claimed is:

1. A piezoelectric ceramic material consisting essentially of the composition which is represented by the formula $$[Pb(Mn_{1/3}Z_{2/3})O_3]_x[PbTiO_3]_y[PbZrO_3]_z$$

where $x$, $y$ and $z$ represent a set of mol ratios and $x+y+z=1.00$ and where Z represents one element selected from the group consisting of Nb, Ta, Sb, and Bi, and which falls within the area A-B-C-D-E-F of FIG. 1 of the drawing where Nb is selected for Z, within the area G-H-I-J-K-L-M-N-O of FIG. 4 of the drawing where Ta is selected for Z, within the area *a-b-c-d-e-f-g* of FIG. 7 of the drawing in case Sb is selected for Z, and within the area *h-i-j-k-l m* of FIG. 10 of the drawing where Bi is selected for Z, the sets of mol ratios of the vertices of said areas being as follows:

| | x | y | z |
|---|---|---|---|
| A | 0.10 | 0.80 | 0.10 |
| B | 0.01 | 0.71 | 0.28 |
| C | 0.01 | 0.09 | 0.90 |
| D | 0.10 | 0.00 | 0.90 |
| E | 0.60 | 0.00 | 0.40 |
| F | 0.60 | 0.30 | 0.10 |
| G | 0.01 | 0.55 | 0.44 |
| H | 0.01 | 0.09 | 0.90 |
| I | 0.05 | 0.05 | 0.90 |
| J | 0.20 | 0.05 | 0.75 |
| K | 0.50 | 0.23 | 0.27 |
| L | 0.30 | 0.50 | 0.20 |
| M | 0.10 | 0.70 | 0.20 |
| N | 0.05 | 0.70 | 0.25 |
| O | 0.02 | 0.68 | 0.30 |
| *a* | 0.10 | 0.80 | 0.10 |
| *b* | 0.01 | 0.71 | 0.28 |
| *c* | 0.01 | 0.09 | 0.90 |
| *d* | 0.05 | 0.05 | 0.90 |
| *e* | 0.30 | 0.05 | 0.65 |
| *f* | 0.30 | 0.50 | 0.20 |
| *g* | 0.20 | 0.70 | 0.10 |
| *h* | 0.01 | 0.60 | 0.39 |
| *i* | 0.01 | 0.09 | 0.90 |
| *j* | 0.05 | 0.05 | 0.90 |
| *k* | 0.20 | 0.20 | 0.60 |
| *l* | 0.20 | 0.43 | 0.37 |
| *m* | 0.10 | 0.60 | 0.30 |

2. The piezoelectric ceramic of claim 1, wherein the composition is represented by the formula $$[Pb(Mn_{1/3}Sb_{2/3})O_3]_x[PbTiO_3]_y[PbZrO_3]_z$$

wherein $x$, $y$ and $z$ represent a set of mol ratios and $x+y+z=1.00$ and which falls within the area *a-b-c-d-e-f-g* of FIG. 7 of the drawing; the set of mol ratios of the vertices of said area being as follows:

| | x | y | z |
|---|---|---|---|
| *a* | 0.10 | 0.80 | 0.10 |
| *b* | 0.01 | 0.71 | 0.28 |
| *c* | 0.01 | 0.09 | 0.90 |
| *d* | 0.05 | 0.05 | 0.90 |
| *e* | 0.30 | 0.05 | 0.65 |
| *f* | 0.30 | 0.50 | 0.20 |
| *g* | 0.20 | 0.70 | 0.10 |

3. The piezoelectric ceramic of claim 1, wherein the composition is represented by the formula:

$$[Pb(Mn_{1/3}Bi_{2/3})O_3]_x[PbTiO_3]_y[PbZrO_3]_z$$

wherein $x$, $y$ and $z$ represent a set of mol ratios and $x+y+z=1.00$ and which falls within the area *h-i-j-k-l-m* of FIG. 10 of the drawing; the set of mol ratios of the vertices of said area being as follows:

| | x | y | z |
|---|---|---|---|
| *h* | 0.01 | 0.60 | 0.39 |
| *i* | 0.01 | 0.09 | 0.90 |
| *j* | 0.05 | 0.05 | 0.90 |
| *k* | 0.20 | 0.20 | 0.60 |
| *l* | 0.20 | 0.43 | 0.37 |
| *m* | 0.10 | 0.60 | 0.30 |

4. A piezoelectric ceramic material consisting essentially of the composition which is represented by the formula $$[Pb(Mn_{1/3}Nb_{2/3})O_3]_x[PbTiO_3]_y[PbZrO]_z$$

where $x$, $y$ and $z$ represent a set of mol ratios and $x+y+z=1.00$ and which falls within the area A-B-C-D-E-F of FIG. 1 of the drawing; the sets of mol ratios of the vertices of said area being as follows:

| | x | y | z |
|---|---|---|---|
| A | 0.10 | 0.80 | 0.10 |
| B | 0.01 | 0.71 | 0.28 |
| C | 0.01 | 0.09 | 0.90 |
| D | 0.10 | 0.00 | 0.90 |
| E | 0.60 | 0.00 | 0.40 |
| F | 0.60 | 0.30 | 0.10 |

5. A piezoelectric ceramic material consisting essentially of the composition which is represented by the formula $$[Pb(Mn_{1/3}Ta_{2/3})O_3]_x[PbTiO_3]_y[PbZrO]_z$$

where $x$, $y$ and $z$ represent a set of mol ratios and $x+y+z=1.00$ and which falls within the area G-H-I-J-K-L-M-N-O of FIG. 4 of the drawing; the sets of mol ratios of the vertices of said area being as follows:

| | x | y | z |
|---|---|---|---|
| G | 0.01 | 0.55 | 0.44 |
| H | 0.01 | 0.09 | 0.90 |
| I | 0.05 | 0.05 | 0.90 |
| J | 0.20 | 0.05 | 0.75 |
| K | 0.50 | 0.23 | 0.27 |
| L | 0.30 | 0.50 | 0.20 |
| M | 0.10 | 0.70 | 0.20 |
| N | 0.05 | 0.70 | 0.25 |
| O | 0.02 | 0.68 | 0.30 |

References Cited

UNITED STATES PATENTS 3,268,453 8/1966 Ouchi et al. .......... 252—62.9
3,268,783 8/1966 Saburi .............. 106—39
3,400,076 9/1968 Ouchi et al. .......... 252—62.9

TOBIAS E. LEVOW, Primary Examiner
J. COOPER, Assistant Examiner

U.S. Cl. X.R.

106—39 R